United States Patent
Pieper

[11] B 3,984,701
[45] Oct. 5, 1976

[54] TORQUEMETER CIRCUIT

[75] Inventor: Keith A. Pieper, Brownsburg, Ind.

[73] Assignee: General Motors Corporation, Detroit, Mich.

[22] Filed: Jan. 10, 1975

[21] Appl. No.: 540,078

[44] Published under the second Trial Voluntary Protest Program on January 13, 1976 as document No. B 540,078.

[52] U.S. Cl. ............................. 307/232; 324/83 A
[51] Int. Cl.² .......................................... H03K 5/20
[58] Field of Search ............. 324/83 R, 83 A, 83 D, 324/86, 176, 177; 328/62, 63, 109, 133, 155; 307/232; 73/99, 136 A, 140

[56] References Cited
UNITED STATES PATENTS

| | | | |
|---|---|---|---|
| 2,933,722 | 4/1960 | Steinman | 324/83 D |
| 3,657,659 | 4/1972 | Johnson | 307/232 |

Primary Examiner—R. V. Rolinec
Assistant Examiner—Michael J. Tokar
Attorney, Agent, or Firm—Paul Fitzpatrick

[57] ABSTRACT

A circuit for generating a potential indicative of torque. The circuit responds to the phase angle between the AC signals generated by two generating coils or magnetoelectric pickups, each excited by a toothed wheel. The two toothed wheels are connected to different points along a shaft transmitting power between an engine and its load. The windup or torsion of the shaft is proportional to torque; therefore, the relative phase angle of the signals from the two pickups is also proportional to torque. Each generating coil is connected to a high-gain input amplifier which generates a square-wave signal in phase with the signal from the coil. Each input amplifier triggers a pulse generator which generates a pulse the leading edge of which is in fixed phase relation to the pickup signal. The two pulse generator outputs are connected to a flip-flop circuit to generate a zero output signal during the interval between the two inputs to the flip-flop. The duty cycle of this signal is indicative of torque. The flip-flop output signal is transmitted through two driver circuits to an averaging circuit including two integrating circuits in series which provides an output potential proportional to torque. Each integrating circuit includes means for calibrating the circuit in response to a simulated predetermined torque signal. One calibration establishes a zero or datum point and the other establishes the gain of the circuit. The circuit is particularly insensitive to variations in speed of the torque shaft and ambient temperature.

4 Claims, 1 Drawing Figure

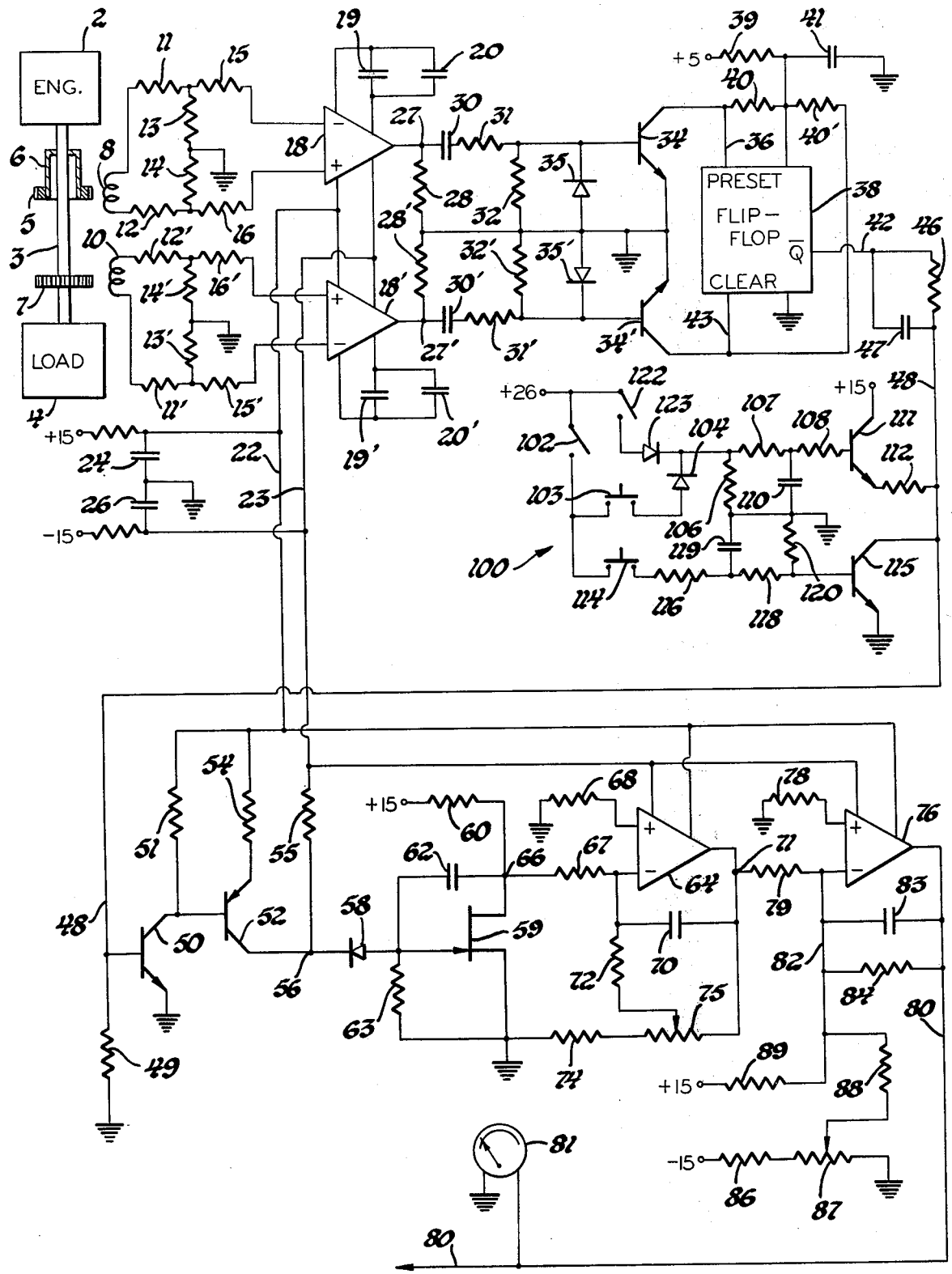

TORQUEMETER CIRCUIT

The invention described herein was made in the course of work under a contract with the Department of Defense.

My invention is directed to a circuit for generating a signal proportional to the phase difference of two alternating current inputs particularly intended to respond to relative phase angle of two outputs of a torque transducing apparatus and to provide an output potential proportional to torque. The circuit is particularly adapted for use in monitoring and control of aircraft power plants and for this reason has as important objects a high degree of insensitivity to rotational speed of the shaft in which the torque is measured and to changes in temperature of the environment.

The principal objects of the invention are to provide improved torque measuring apparatus, to provide torque measuring apparatus particularly suited for use with aircraft power plants, to provide torque measuring apparatus which is accurate notwithstanding variation in speed of the shaft through which the measured torque is transmitted and notwithstanding variations in temperature of the environment in which the apparatus is used. A further object is to provide an electronic circuit for generating a potential or current output proportional to the relative phase angle of two signals received from an input device such as a torque transducer; a still further object is to provide such a circuit with improved arrangements for calibrating the circuit to provide an output accurately corresponding to the input.

The nature of my invention and its advantages will be clear to those skilled in the art from the succeeding detailed description of the preferred embodiment of the invention, the accompanying drawing thereof, and the appended claims.

The figure is a schematic diagram of a torque measuring apparatus embodying the invention.

The drawing illustrates schematically an engine 2 which may be a turboshaft aircraft engine. The engine drives a power output shaft 3 which transmits power and torque into a load 4 which may be, for example, the gear box and lifting rotor of a helicopter. The engine may operate at various speeds; the shaft 3, being elastic, is wound up or twisted proportionally to the torque transmitted through it. To measure this torque, a torque transducing apparatus is used to provide two alternating current output signals the relative phase angle of which is a linear function of the torque. Such a torque transducing arrangement is described and claimed in Tyler et al U.S. Pat. No. 2,766,617, Oct. 16, 1966. It employs a toothed wheel 5 fixed to shaft 3 by a sleeve 6 at one point along its length and a second toothed wheel 7 fixed to the shaft at another point along its length. The wheels have equal numbers of teeth. Each toothed wheel induces an alternating current in its respective pickup coil 8 or 10. The alternating current developed by coil 8 is termed the reference signal and that developed by coil 10 the torque signal. The relative phase angle or phase displacement between the two signals is a linear function of the windup of the shaft and, therefore, of the torque. The physical structure of such a device is well known; many such are employed and, in general, it may be similar to the structure described in the Tyler et al patent.

The reference and torque signals from the pickup coils 8 and 10 are fed through two identical channels to a bistable flip-flop circuit which controls integrating circuits which generate the potential indicative of torque. Considering first the channel leading from the reference pickup 8, the signal is fed through an attenuating circuit comprising resistors 11, 12, 13, 14, 15, and 16, each of 2.2 kilohm resistance, to the input terminals of an operational amplifier 18. This amplifier is one-half of an operational amplifier assembly identified as type MC 1537L manufactured by Motorola Semiconductor Products, Inc., Phoenix, Arizona. It has a very high gain and produces a square wave which is in phase with the input signal. The attenuating network reduces the amplitude of the voltage from the pickup to suit the particular operational amplifier, which has a plus or minus 5 volt input limit, and provides a grounded center tap for the input.

The operational amplifier 18 is operated to provide very high gain; in other words, when the first signal goes positive the output voltage of the amplifier goes to saturation, approximately plus 13 volts. When the reference signal is negative, the amplifier output tends to go negative. A 27 picofarad capacitor 19 connected between the Nos. 3 and 4 terminals of the amplifier slows down the amplifier sufficiently to prevent high frequency noise in the input from triggering the pulse circuitry. A second capacitor 20 in parallel to capacitor 19 may be added for calibrating the circuits, as will be described below.

Amplifier 18 is energized from controlled plus 15 volt and minus 15 volt inputs through lines 22 and 23 which are led to the No. 14 and No. 7 terminals of the amplifier, respectively. Lines 22 and 23 are grounded through 22 microfarad capacitors 24 and 26, respectively, which filter the DC input. The output of the operational amplifier is from its terminal No. 2 through a junction 27 and a load resistor 28 of 10 kilohms to ground. Junction 27 is connected through a 120 picofarad capacitor 30, a 3 kilohm resistor 31, and a 1 kilohm resistor 32 in series to ground. The junction between resistors 31 and 32, which act as a voltage divider, is connected to the base of an NPN transistor 34, type 2N2222A, the emitter of which is grounded. A diode 35, type In4148, is connected across the emitter-base circuit of the transistor. The collector of transistor 34 provides an output in line 36 to the Preset input of a bistable flip-flop circuit 38. The flip-flop circuit is preferably type SN 5472 manufactured by Texas Instruments Incorporated, Dallas, Texas.

When the reference signal from pickup coil 8 into the input of operational amplifier 18 goes positive, the output on junction 27 goes from minus 13 volts to plus 13 volts, and remains at this level until the pickup signal reverses polarity. During the swing from negative to positive in output 27, the signal is transmitted through capacitor 30 and the voltage divider 31, 32 to the base of transistor 34 to turn the transistor on by base drive. As capacitor 30 charges, this input rapidly decays and transistor 34 turns off. The Preset input line 36 of the flip-flop is energized from a plus 5 volt circuit through a 20 ohm resistor 39 and a 10 kilohm resistor 40. A 10 microfarad capacitor 41 is connected from the junction between resistors 39 and 40 to ground. When the transistor 34 is turned off, the input 36 is approximately 5 volts. When the transistor turns on, this input is reduced approximately to ground potential, which sets the flip-flop output from pin 6 on a line 42 to zero volts. After capacitor 30 charges, transistor 34 will turn off, opening the ground on the Preset input line which then returns to the 5 volt level. With the circuit constants described, the Preset input will last approximately 2 microseconds.

When the reference signal goes negative, the output on line 27 will change in a negative direction. The diode 35 prevents the base of transistor 34 from going negative more than 0.5 volts, so that the transistor will not be damaged.

A signal to clear the flip-flop, which is supplied to the flip-flop through a line 43, is generated by a circuit which may be regarded as a second input channel, from the torque pickup 10, identical to the channel from the reference pickup 8. Since the channels are identical, the second channel will not be described, and its elements are identified by the same numerals as those of the reference channel with primes added to the numerals. The signal on line 43, which normally is plus 5 volts through resistors 39 and 40', is reduced to zero during the 2 microsecond intervals after the signal from pickup 10 goes positive. This signal is fed to the Clear input to the flip-flop, returning the output signal on line 42 to the plus 5 volt level. This is inherent in the operation of the particular flip-flop circuit. Other available circuits may be used to obtain the same result.

Thus, the output of the flip-flop is zero volts during the interval from the time the signal from pickup 8 goes positive until the time the signal from pickup 10 goes positive. The fraction of the total cycle during which the output is zero is thus proportional to the phase difference of the two signals and, therefore, to torque.

The signal in line 42 is transmitted through a differentiating network comprising 8.2 kilohm resistor 46 and 820 pF capacitor 47 in parallel to a driver circuit input line 48. Capacitor 47 speeds up the switching of the driver circuit. Line 48 is grounded through a 4.7 kilohm resistor 49 and is connected to the base of an NPN transistor 50, type 2N2222A, the emitter of which is grounded and the base of which is energized from the plus 15 volt line 22 through a 2 kilohm resistor 51. The collector of transistor 50 is connected to the base of a PNP transistor 52, type 2N2907A. The emitter of transistor 52 is energized from the plus 15 volt line through a 3 kilohm resistor 54, and its collector is connected to the minus 15 volt supply through a 3 kilohm resistor 55. Therefore, when this transistor is turned off, the potential on junction 56 connected to the collector goes to minus 15 volts. When the transistor is conducting, the potential on junction 56 is approximately zero volts. When the signal in line 48 is zero, transistor 50 is turned off, turning off transistor 52. Thus the output of transistor 52 at junction 56 is minus 15 volts when the flip-flop is preset and goes to zero when the flip-flop is cleared. The potential on junction 56 is conducted through a diode 58 to the gate of a field effect transistor (FET) 59. The source terminal of this FET is grounded and the drain is connected to plus 15 volts through a 15 kilohm resistor 60. A 36 pF capacitor 62 interconnecting the gate the drain shapes the switched waveform to compensate for the rise and fall times of the FET. A 20 kilohm resistor 63 interconnects the gate and source.

FET 59 controls the flow of current into a first averaging circuit including an operational amplifier 64, type MC 1741 made by Motorola Semiconductor Products Inc., Phoenix, Arizona. When the gate of FET 59 is energized at minus 15 volts, the FET is essentially an open circuit. When the minus 15 volt signal through diode 58 is turned off and the gate is grounded through resistor 63, it is effectively a closed switch; a low resistance path grounding the drain electrode. The drain is connected to a junction 66 which is connected to plus 15 volts through the 15 kilohm resistor 60 and to the minus input of operational amplifier 64 through a 15 kilohm resistor 67. When the FET is conducting, this grounds the point 66, so there is no current flow into amplifier 64 of the first integrating circuit. When the circuit through the FET is open, the 15 volts feeding through the 30 kilohm total of resistors 60 and 67 delivers a one-half milliampere current into the operational amplifier. Since this current flows during the time between preset and clear of the flip-flop, the total or integrated current flow is proportional to the phase difference between the pickups 8 and 10.

The operational amplifier 64 is energized off the plus and minus 15 volt supply lines 22 and 23 and its plus input is grounded through an 8.2 kilohm resistor 68. A 0.1 microfarad capacitor 70 connected between the output and the minus input of amplifier 64 integrates the pulses entering the amplifier through resistor 67 to produce an output voltage at junction 71 proportional to torque. The gain of the amplifier is determined by a 16.2 kilohm resistor 72, a 14.3 kilohm resistor 74, and a 2 kilohm potentiometer 75 connected as shown. The circuit is calibrated by an adjustment of potentiometer 75, as will be described later.

The average output on junction 71 is fed through a second averaging circuit including an operational amplifier 76 which, like amplifier 64, is type MC 1741. The plus input of the amplifier is grounded through a 3.9 kilohm resistor 78 and junction 71 is connected to the negative input through a 10 kilohm resistor 79. The output line 80 from amplifier 76 carries the final emf signal proportional to torque to whatever device is to be controlled or is used to indicate the magnitude of torque. A voltmeter 81 calibrated in torque units is indicated on the FIGURE. A line 82 connected to the minus input of amplifier 76 receives a feedback from line 80 through a 0.1 microfarad capacitor 83 and a 10 kilohm resistor 84 connected in parallel.

Operational amplifier 76 receives a variably settable bias to control its zero setting from the following circuit; the minus 15 volt controlled input is fed through a 13.3 kilohm resistor 86 and a 2 kilohm potentiometer 87 to ground. The voltage taken off the tap of the potentiometer is fed into the minus input of amplifier 76 through 20 kilohm resistor 88. A fixed bias to allow the output of amplifier 76 to go negative if needed in calibration is provided by the following circuit. The plus 15 volt controlled input is fed through a 499 kilohm resistor 89 to the minus input of amplifier 76. The input through resistor 79 from the first averaging circuit, the fixed bias input through resistor 89, and the variable bias input through resistor 88 are summed at the minus input of amplifier 76.

Before going into the matter of calibration, it may be well to review the operation of the circuits. Briefly, during each revolution of the shaft 3, pickup coils 8 and 10 generate a number of cycles of alternating current, depending upon the number of teeth in the gears 5 and 7. The signal from pickup 8 leads that from pickup 10, the difference of phase angle being a linear function of torque. When the signal from pickup 8 goes positive, the first channel including operational amplifier 18 and transistor 34 delivers a momentary pulse to the Preset input line 36 of the flip-flop 38. When the torque signal from pickup 10 goes positive, the second channel involving amplifier 18' and transistor 34' delivers a momentary pulse to the Clear input line 43 of the flip-flop. During the interval between these signals, the output line 42 of the flip-flop is at zero volts. After it has been cleared and until it is again preset, the output is at 5 volts.

When the signal is zero, transistor 50 is turned off, turning off transistor 52 and supplying 15 volts negative through the diode 58 to the gate of FET 59. This keeps the FET turned off so that a constant current is fed into the minus input of averaging amplifier 64 through resistors 60 and 67. During the remainder of the cycle, until the flip-flop is again preset, the drain of FET 59 is grounded and likewise junction 66, so that there is no current flow into the averaging amplifier 64. This amplifier averages or integrates the current flowing to it and, since the amplitude of the signal is constant, the potential output of the amplifier is proportional to the relative part of the duty cycle that the half milliamp signal is supplied to it. The output from this amplifier is fed to a second averaging amplifier 76 which delivers a signal to the output line which is a potential proportional to the torque which is measured. The first averaging circuit includes a potentiometer 75 to set the gain of the circuit, and the second averaging circuit includes a potentiometer 87 to set the bias or datum point of the circuit.

This brings us to the matter of calibration of the circuit, which involves adjustment of potentiometers 75 and 87 while feeding appropriate inputs into line 48. The circuits for supplying the inputs for the gain and bias calibrations are indicated at 100.

For calibration of either bias or gain, a switch 102 must be closed to supply 26 volts positive to the calibrating signal generating circuit. Then to set the bias, a manual switch 103 called the "calibration A" switch is closed. This feeds 26 volts through a diode 104 and a 20 kilohm resistor 106 to ground. The 26 volt signal is filtered by a network comprising 4.7 kilohm resistors 107 and 108 and 1 microfarad capacitor 110 to prevent noise from actuating the calibrating circuit. The output of the filter is applied to the base of an NPN transistor 111, type 2N2222A, the collector of which is connected to the 15 volt supply. The emitter of this transistor is connected through a 2 kilohm resistor 112 to the driver input line 48 which normally carries the output from the flip-flop 38. The resulting signal on line 48 turns transistor 50 on and holds it continuously on, simulating a signal with no off phase and thus representing a zero phase difference. With this signal present, the potentiometer 87 is adjusted until the meter 81 indicates zero torque, thereby setting the datum or bias of the torquemeter circuit. Note that this adjustment is effected through only the second averaging circuit and does not disturb the first averaging circuit including amplifier 64.

After this, to adjust the gain, a manual switch 114, which may be called the "calibration B" switch, is closed to turn on a transistor 115. This is effected through a filter circuit comprising 4.7 kilohm resistors 116 and 118 with their midpoint grounded through 1 microfarad capacitor 119 and a 1 kilohm resistor 120.

When transistor 115 is turned on, it grounds line 48 and thus limits the potential on the base of transistor 50 to approximately 0.2 volts, preventing this transistor from turning on. As a result, the transistor is continually turned off, which simulates a condition in which the phase angle between the reference and torque signals is 360° which would represent whatever value of torque is necessary to twist the shaft through the angle corresponding to an advance of one tooth in the wheel 7. This represents some definite value of torque, and at this time potentiometer 75 is adjusted to regulate the gain of amplifier 64 to provide this output, as indicated by the meter 81. This does not affect the bias setting of the amplifier 76.

In order to balance the delay in the reference channels from pickup 8 to flip-flop input 36 with that in the torque channel from pickup 10 to flip-flop input 43, simulated torque inputs 180° out of phase are applied; in other words, the two channels are energized exactly 180° out of phase by a suitable test generator. With this input, the output voltage indicated by meter 81 should be exactly the average of the calibration A voltage and the calibration B voltage; or, in other words, a torque equal to half that represented by a 360 phase angle should be indicated. If the reading is less than it should be, a capacitor is added at 20'. If it is more, the capacitor is added at 20. It will be seen that ordinarily only one of capacitors 20 and 20' will be present.

The switch 102 is provided to disable the calibration circuits when the torque measuring circuit is being used to control an engine to prevent upsetting of the controls by the spurious torque signal. Switch 102 is opened whenever the control circuits by which the torquemeter affects the operation of the engine are activated.

It is also considered desirable to disable the torquemeter circuit at very low speeds of the output shaft, when torque is relatively slight and it is not desired to have engine torque output used to control relative outputs of power units driving a common load. To effect this, the system includes a switch 122 which connects the 26 volt positive through a blocking diode 123 to the base of transistor 111. With this switch closed, the system, for the reason explained above, will provide a zero torque output signal regardless of the relative phase angle of the inputs at 8 and 10.

A major objective in the conception and development of the torque measuring circuit described above has been to minimize errors in the output resulting from variations in input frequency and variations in ambient temperature. The flip-flop circuit has a considerable degree of temperature sensitivity, but is used in a circuit such that this is immaterial. The FET 59 is advantageous for controlling the integrating circuits because its low resistance in the On condition reduces temperature variation. The driver circuit provides a sufficient negative voltage to turn the FET off from the low level output of the flip-flop. The particular driver configuration promotes frequency and temperature stability. The balancing of the torque and reference channels by the addition of compensating capacitors at 20 or 20' serves to minimize frequency sensitivity of the system.

Tests of three torque converter channels showed excellent lack of sensitivity to temperature and frequency. In this case, the nominal calibration A output was 0.332 volts and nominal calibration B output was 9.271 volts. Simulated inputs of 45°, 90°, 180°, and 270° were used in the tests. The frequency of the inputs varied from 7KHz to 15KHz. The maximum variation of the output with frequency was 0.020 volts or 0.22% of full scale. The maximum variation with temperature over a range from minus 55° to 85°C. was 0.025 volts or 0.27% of full scale.

It should be apparent from the foregoing that the relative phase angle or torque measuring system described is particularly suited to the requirements of practice and has a high level of accuracy and stability.

Specific identification of components and values such as resistance, capacitance, and the like set out above are provided to facilitate practice of the invention and illustrate the best mode presently known of practicing the invention. It will be realized, of course, that such components may be varied to suit a particular installation, the desires of a designer, or to take advantage of advances in the electronic art.

The detailed description of the preferred embodiment of the invention for the purpose of explaining the principles thereof is not to be considered as limiting or restricting the invention, since many modifications may be made by the exercise of skill in the art.

I claim:

1. A relative phase angle measuring circuit comprising, in combination, means effective to receive two AC input signals of equal variable frequency and of variable relative phase angle; a high-gain amplifier responsive to each said input signal operative to generate a square wave signal in phase correspondence with the input signal, at least one amplifier including impedance means adjustable to balance the phase shifts between the input signal and the square wave signal; a bistable flip-flop circuit; means responsive to corresponding current reversals of the square wave signals connected to the flip-flop circuit to set and clear the circuit, respectively, so that the duty cycle of the flip-flop circuit output varies with the relative phase angle of the input signals; a first averaging circuit including an operational amplifier having a constantcurrent input and having capacitive feedback; a driver circuit connecting the flip-flop circuit output to the first averaging circuit input including an FET turned on and off in response to the output of the flip-flop circuit, the FET being connected to disable the constant-current input to the averaging circuit when turned on and to enable the constant-current input to the averaging circuit when turned off; a second averaging circuit responsive to the output of the first averaging circuit including an operational amplifier with capacitive feedback, the second averaging circuit providing an output emf varying linearly with relative phase angle of the input signals; first calibrating means including means effective to provide an input to the driver circuit indicative of zero input signal relative phase angle and means for adjusting the bias of the second averaging circuit; and second calibrating means including means effective to provide an input to the driver circuit indicative of a predetermined substantial input signal relative phase angle and means for adjusting the feedback of the first averaging circuit.

2. A relative phase angle measuring circuit comprising, in combination, means effective to receive two AC input signals of equal variable frequency and of variable relative phase angle; a high-gain amplifier responsive to each said input signal operative to generate a square wave signal in phase correspondence with the input signal; a bistable flip-flop circuit; means reponsive to corresponding current reversals of the square wave signals connected to the flip-flop circuit to set and clear the circuit, respectively, so that the duty cycle of the flip-flop circuit output varies with the relative phase angle of the input signals; a first averaging circuit including an operational amplifier having a constant-current input and having capacitive feedback; a driver circuit connecting the flip-flop circuit output to the first averaging circuit input including an FET turned on and off in response to the output of the flip-flop circuit, the FET being connected to disable the constant-current input to the averaging circuit when turned on and to enable the constant-current input to the averaging circuit when turned off; a second averaging circuit responsive to the output of the first averaging circuit including an operational amplifier with capacitive feedback, the second averaging circuit providing an output emf varying linearly with relative phase angle of the input signals; first calibrating means including means effective to provide an input to the driver circuit indicative of zero input signal relative phase angle and means for adjusting the bias of the second averaging circuit; and second calibrating means including means effective to provide an input to the driver circuit indicative of a predetermined substantial input signal relative phase angle and means for adjusting the feedback of the first averaging circuit.

3. A relative phase angle measuring circuit comprising, in combination, means effective to receive two AC input signals of equal variable frequency and of variable relative phase angle; a high-gain amplifier responsive to each said input signal operative to generate a square wave signal in phase correspondence with the input signal, at least one amplifier including impedance means adjustable to balance the phase shifts between the input signal and the square wave signal; a bistable flip-flop circuit; means responsive to corresponding current reversals of the square wave signals connected to the flip-flop circuit to set and clear the circuit, respectively, so that the duty cycle of the flip-flop circuit output varies with the relative phase angle of the input signals; an averaging circuit including an operational amplifier having a constant-current input and having capacitive feedback; and a driver circuit connecting the flip-flop circuit output to the first averaging circuit input including an FET turned on and off in response to the output of the flip-flop circuit, the FET being connected to disable the constant-current input to the averaging circuit when turned on and to enable the constant-current input to the averaging circuit when turned off.

4. A torque measuring circuit comprising, in combination, transducer means operable to generate two AC input signals of equal variable frequency and of relative phase angle indicative of the value of torque responded to by the transducer means; an open-loop high-gain amplifier responsive to each said input signal operative to generate a square wave signal in phase correspondence with the input signal, at least one amplifier including impedance means adjustable to balance the phase shifts between the input signal and the square wave signal; a bistable flip-flop circuit; means responsive to corresponding current reversals of the square wave signals connected to the flip-flop circuit to set and clear the circuit, respectively, so that the duty cycle of the flip-flop circuit output varies with the relative phase angle of the input signals; a first averaging circuit including an operational amplifier with capacitive feedback; a driver circuit connecting the flip-flop circuit output to the first averaging circuit input including an FET turned on and off in response to the output of the flip-flop circuit, the FET being connected to supply one input current to the averaging circuit when turned on and another input current to the averaging circuit when turned off; a second averaging circuit responsive to the output of the first averaging circuit including an operational amplifier with capacitive feedback, the second averaging circuit providing an output emf varying linearly with relative phase angle of the input signals; first calibrating means including means effective to provide an input to the driver circuit indicative of zero input signal relative phase angle and means for adjusting the bias of the second averaging circuit; and second calibrating means including means effective to provide an input to the driver circuit indicative of a predetermined substantial input signal relative phase angle and means for adjusting the feedback of the first averaging circuit.

* * * * *